US012343296B2

(12) United States Patent
Rembao et al.

(10) Patent No.: US 12,343,296 B2
(45) Date of Patent: Jul. 1, 2025

(54) CALF STRETCHING APPARATUS

(71) Applicants: John A. Rembao, Ben Lomond, CA (US); Gerard J. Collet, South Jordan, UT (US)

(72) Inventors: John A. Rembao, Ben Lomond, CA (US); Gerard J. Collet, South Jordan, UT (US)

( * ) Notice: Subject to any disclaimer, the term of this patent is extended or adjusted under 35 U.S.C. 154(b) by 924 days.

(21) Appl. No.: 17/507,722

(22) Filed: Oct. 21, 2021

(65) Prior Publication Data

US 2022/0117822 A1 Apr. 21, 2022

Related U.S. Application Data

(60) Provisional application No. 63/094,776, filed on Oct. 21, 2020.

(51) Int. Cl.
*A61H 1/02* (2006.01)

(52) U.S. Cl.
CPC ... *A61H 1/0266* (2013.01); *A61H 2201/1253* (2013.01); *A61H 2201/164* (2013.01); *A61H 2201/1692* (2013.01)

(58) Field of Classification Search
CPC .......... A61H 1/0266; A61H 2201/1253; A61H 2201/164; A61H 2201/1692; A61H 1/0237; A61H 1/02; A61H 39/04; A61H 2203/0406; A61H 2205/106; A61H 2205/12; A61H 2205/125; A61H 2201/0157; A63B 21/4037; A61G 13/125; A47C 20/021
See application file for complete search history.

(56) References Cited

U.S. PATENT DOCUMENTS

| | | | | |
|---|---|---|---|---|
| 4,429,868 A | 2/1984 | LeBlanc et al. | | |
| 4,693,470 A | 9/1987 | Ogawa | | |
| D298,266 S | 10/1988 | Reyneke | | |
| 5,087,036 A | 2/1992 | Cooper | | |
| D347,869 S | 6/1994 | Friend | | |
| 5,474,509 A | 12/1995 | Hodgdon | | |
| 5,558,606 A | 9/1996 | Poncini et al. | | |
| 6,228,005 B1 * | 5/2001 | Gray | .................... | A63B 21/068 482/148 |
| 6,244,992 B1 | 6/2001 | James | | |
| 6,425,843 B1 | 7/2002 | Storfer et al. | | |
| 6,589,141 B1 | 7/2003 | Flaggs | | |
| 6,699,163 B2 | 3/2004 | Gallagher | | |
| 7,125,373 B1 | 10/2006 | Garza | | |
| 7,857,733 B2 | 12/2010 | Tsakiris | | |
| 7,874,971 B2 | 1/2011 | Reyes | | |

(Continued)

FOREIGN PATENT DOCUMENTS

WO 8401723 A1 5/1984

*Primary Examiner* — Kendra D Carter
*Assistant Examiner* — Jaeick Jang
(74) *Attorney, Agent, or Firm* — MORRISS O'BRYANT COMPAGNI CANNON, PLLC

(57) ABSTRACT

A calf stretching apparatus includes a plate and a side wall upwardly extending from the top surface of the plate and disposed along the perimeter edges of the plate. Each of the plurality of side walls has a different height and is disposed proximate a respective perimeter edge of the plate. The plurality of side walls defines an inner space between inside surfaces of each of the plurality of side walls and the top surface of the plate.

18 Claims, 8 Drawing Sheets

(56) References Cited

U.S. PATENT DOCUMENTS

| | | | |
|---|---|---|---|
| 8,177,693 B2 | 5/2012 | Webber et al. | |
| 9,259,608 B2 | 2/2016 | Beck et al. | |
| 10,206,845 B1 | 2/2019 | Barouche | |
| 10,406,395 B2 | 9/2019 | Haas | |
| 10,549,142 B1 | 2/2020 | Ash | |
| 2002/0193210 A1 | 12/2002 | Turner | |
| 2007/0219071 A1 | 9/2007 | Hamer | |
| 2009/0111669 A1 | 4/2009 | Richter | |
| 2010/0035733 A1 | 2/2010 | Tsakiris | |
| 2010/0234195 A1 | 9/2010 | Koskela | |
| 2013/0035217 A1 | 2/2013 | Beck et al. | |
| 2014/0100086 A1 | 4/2014 | Pagliaro | |
| 2014/0100087 A1 | 4/2014 | Ha | |
| 2014/0274589 A1 | 9/2014 | Harkins | |
| 2016/0199690 A1* | 7/2016 | Islas | A63B 21/00047 482/79 |
| 2017/0239507 A1 | 8/2017 | Haas | |

* cited by examiner (Section A-A)

CALF STRETCHING APPARATUS

CROSS-REFERENCE TO RELATED APPLICATION

The present application claims priority to and is a non-provisional of U.S. Provisional Patent Application Ser. No. 63/094,776 filed on Oct. 21, 2020, the entirety of which is incorporated by this reference.

BACKGROUND

Field of the Invention

The present invention relates generally to devices used for calf stretching and more specifically to portable calf stretching devices.

The Prior Art

Various devices for athletes and others to stretch their calves have been developed for decades. Such devices include complex systems that are expensive, often non-portable and non-durable. There exists a need in the art, however, to provide a calf stretching apparatus that allows for various decrees of calf stretching that is portable, durable and relatively easy to manufacture.

SUMMARY OF THE INVENTION

Accordingly, the present invention provides an improved calf stretching apparatus that is comprised of a multi-sided platform of various heights to provide multiple positions and levels of calf stretching. In one embodiment, the calf stretching apparatus of the present invention is comprised of six sides forming a hexagon having a perimeter wall that varies in height along its sides. That is, each side of the hexagon has a different height wall, each to provide a different level of calf stretching when the calf stretching apparatus is placed on a surface, such as the ground. When the ball of the foot of a user is place proximate the top of the wall and the heal of the foot is place inside the device, the user can stretch their calf by raising their lower leg to a more vertical position relative to the device. Depending on the height of the wall upon which the ball of the foot is placed, a higher or lower level of stretching can be achieved. The calf stretching apparatus of the invention is configured to be portable and durable and is relatively inexpensive to manufacture.

In one embodiment, a calf stretching apparatus of the invention includes a planar base having a plurality of sides. A plurality of side walls upwardly depend from the planar base. Each of the plurality of side walls extends along a respective side of the planar base and each of the plurality of side walls have a different height than an adjacent side wall. The plurality of side walls define an inner space between inside surfaces of each of the plurality of side walls and the planar base portion extends between each of the plurality of side walls.

In another embodiment, the base portion defines an oblong opening that extends therethrough and that is configured to be grasped by a user. The oblong opening may be positioned proximate the inside surface of one of the plurality of side walls and extends parallel thereto.

In yet another embodiment, the plurality of side walls comprises six side walls in the shape of a hexagon.

In still another embodiment, each of the plurality of side walls has a height in a range from approximately 2 inches to approximately 3.3 inches.

In yet another embodiment, a first side wall of the plurality of side walls has a height of approximately 2 inches, a second side wall of the plurality of side walls has a height of approximately 2.3 inches, a third side wall of the plurality of side walls has a height of approximately 2.5 inches, a fourth side wall of the plurality of side walls has a height of approximately 2.8 inches, a fifth side wall of the plurality of side walls has a height of approximately 3 inches, and a sixth side wall of the plurality of side walls has a height of approximately 3.3 inches.

In another embodiment, the plurality of side walls is interconnected to one another to form a continuous wall around the base.

In yet another embodiment, a vertical transition from a change in height is formed between each of the plurality of side walls.

In still another embodiment, each of the plurality of side walls is formed from a solid material and may be formed from rubber or plastic.

In another embodiment, a calf stretching apparatus is comprised of a plate having a top surface, a bottom surface and a plurality of perimeter edges. A continuous side wall upwardly extending from the top surface of the plate and is disposed along the plurality of perimeter edges. Each of the plurality of side walls has a different height and each of the plurality of side walls is disposed proximate a respective perimeter edge of the plate. The plurality of side walls define an inner space between inside surfaces of each of the plurality of side walls and the top surface of the plate.

In yet another embodiment, each of the plurality of side walls has a curved top surface extending between the inside surface of the side wall and an outside surface of the side wall.

In still another embodiment, the inside surface of each of the plurality of side walls is oriented at a 90 degree angle to the top surface of the plate.

In yet another embodiment, the outside surface of each of the plurality of side walls is angled toward the top surface of the plate at an angle less than 90 degrees relative to the top surface of the plate.

In still another embodiment, the outside surface of each of the plurality of side walls is angled toward the top surface of the plate with a first side wall of the plurality of side walls at an angle of approximately 74 degrees relative to the top surface of the plate, a second side wall of the plurality of side walls at an angle of approximately 76 degrees relative to the top surface of the plate, a third side wall of the plurality of side walls at an angle of approximately 77 degrees relative to the top surface of the plate, a fourth side wall of the plurality of side walls at an angle of approximately 79 degrees relative to the top surface of the plate, a fifth side wall of the plurality of side walls at an angle of approximately 80 degrees relative to the top surface of the plate and a sixth side wall of the plurality of side walls at an angle of approximately 81 degrees relative to the top surface of the plate.

In still another embodiment, the bottom surface of the plate includes a textured gripping surface.

These and other aspects of the present invention may be realized in an improved calf stretching apparatus as shown and described in the following figures and related description.

BRIEF DESCRIPTION OF THE DRAWINGS

When considered in connection with the following illustrative figures, a more complete understanding of the present invention may be derived by referring to the detailed description. In the figures, like reference numbers refer to like elements or acts throughout the figures. Various embodiments of the present invention are shown and described in reference to the numbered drawings.

Figure 1:
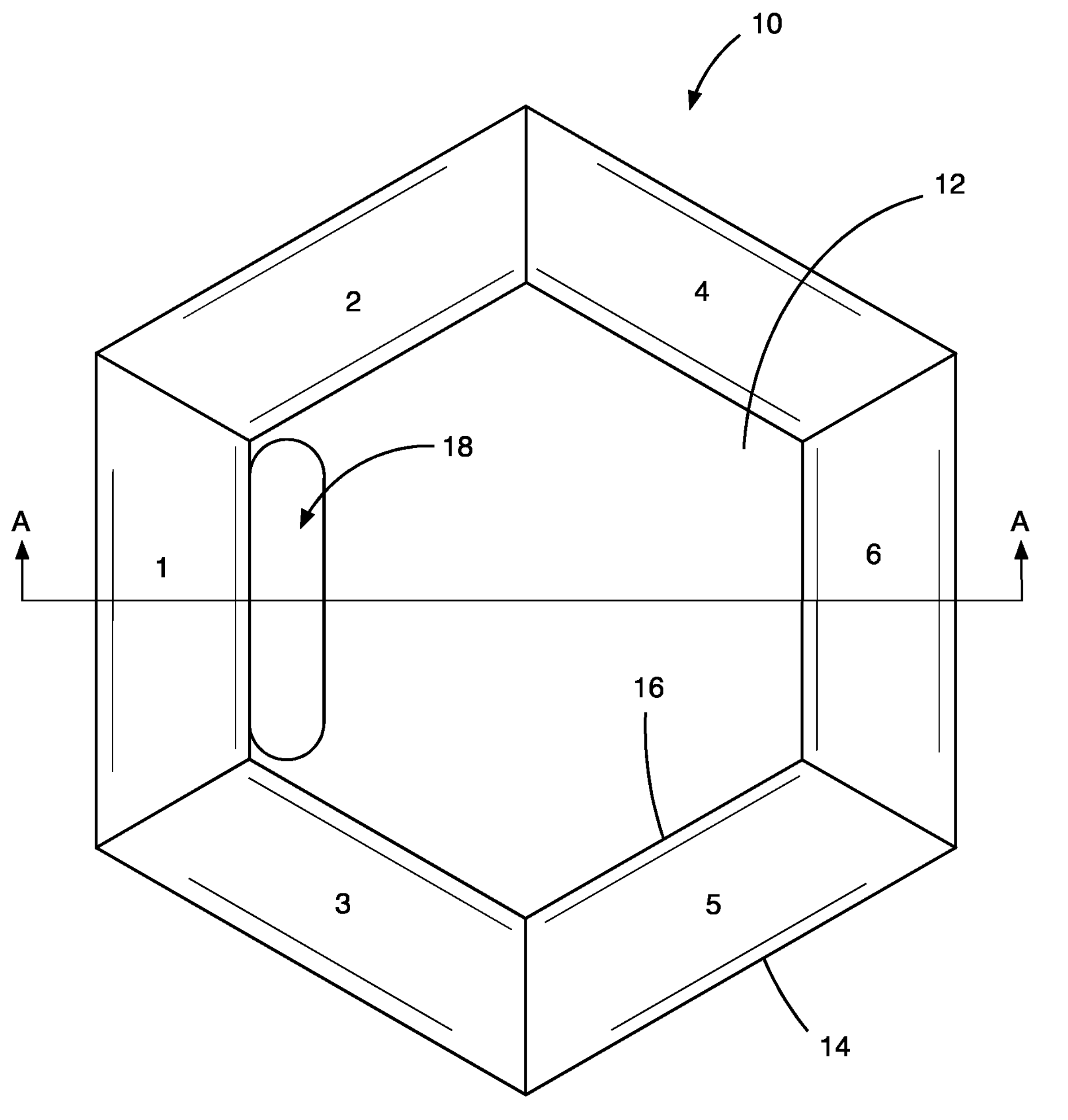
FIG. 1 is a top view of a first embodiment of a calf stretching apparatus in accordance with the principles of the present invention.

It will be appreciated that the drawings are illustrative and not limiting of the scope of the invention, which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention. Elements and acts in the figures are illustrated for simplicity and have not necessarily been rendered according to any particular sequence or embodiment.

DETAILED DESCRIPTION OF THE ILLUSTRATED EMBODIMENTS

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for" and the specific function, without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. Thus, the full scope of the inventions is not limited to the examples that are described below.

FIG. 1 illustrates a calf stretching apparatus, generally indicated at 10, in accordance with the principles of the present invention. The calf stretching apparatus is comprised of a planar base plate 12 bound by a plurality of wall portions 1-6. In the embodiment shown in FIG. 1, the calf stretching apparatus has a hexagonal shape when viewed from the top as shown. Each of the wall portions 1-6 form one side of the hexagonal calf stretching apparatus 10. Each wall has a width that extends from the outer edge 14 of the calf stretching apparatus 10 to an inner wall surface 16 that provides sufficient lateral support to the wall portions 1-6 when the weight of a user is placed on top of a particular wall portion 1-6 without bending or collapsing. Each wall portion 1-6 may have a width of approximately 2 inches. As will be described in more detail, herein, each wall portion 1-6 has a different height than the others to provide different levels of calf stretching for a user.

As previously mentioned with reference to FIG. 1, each wall portion 1-6 has a different height, with wall portion 1 having the lowest height, and wall portion 6 having the tallest height relative to the base plate 12. Wall portion 2 is taller than wall portion 1 but shorter than wall portion 3. Likewise, wall portion 3 is taller than wall portion 2 but shorter than wall portion 4. Wall portion 4 is taller than wall portion 3 but shorter than wall portion 5. Finally, wall portion 5 is taller than wall portion 4 but shorter than wall portion 6. The length of each wall portion 1-6 is the same for each wall portion so as to form a hexagon, with the length being sufficient to support the foot of user when placed thereon, including a width of a shoe if so worn by the user. Thus, each wall portion may have a length of approximately 5-6 inches but could be more to increase the overall size of the calf stretching apparatus 10.

The base plate 12 defines an oblong opening 18 at one side thereof proximate to one of the side wall portions 1. The width and length of the opening 18 is sized to receive a hand of user to reach through the opening 18 and grasp the calf stretching apparatus 10 for carrying. In addition, the opening 18 also provides for water drainage if the calf stretching apparatus 10 is left outside where sprinkler water or rain would otherwise collect. Opening 18 also provides an aperture through which the calf stretching apparatus 10 can be secured to a structure with a locking cable, chain or other similar device to prevent the calf stretching apparatus 10 from being removed from the premises.

Figure 2:
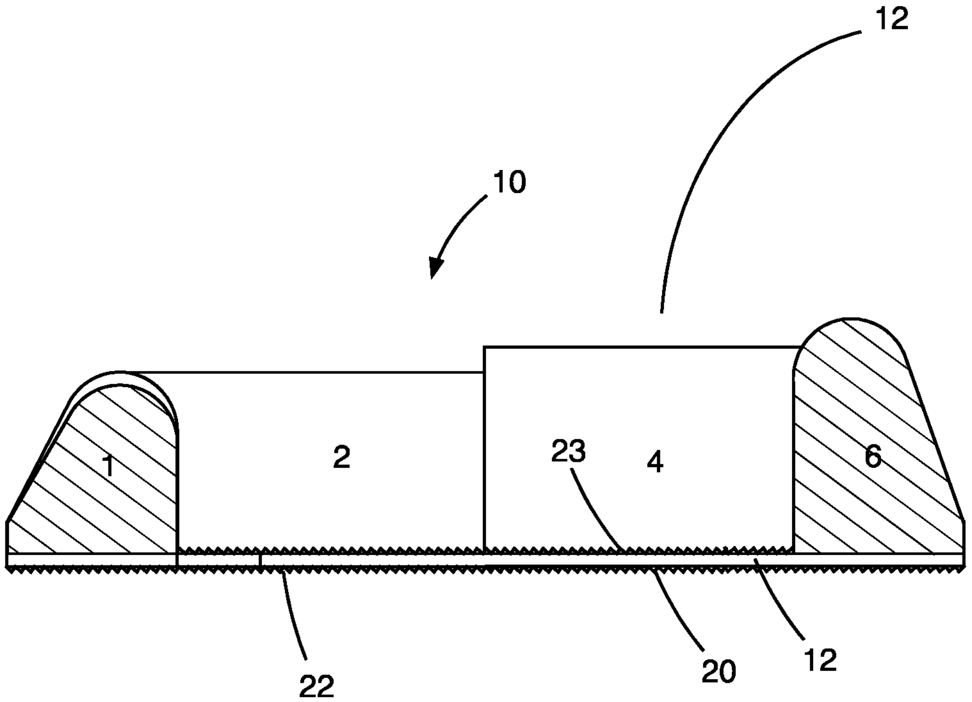
FIG. 2 is a cross-sectional side view of the calf stretching apparatus shown in FIG. 1.

As shown in FIG. 2 (cross-section A-A represented by arrows A-A in FIG. 1), each side of the calf stretching apparatus 10 has a staggered height from the shortest wall portion 1 to the tallest wall portion 6, which resides opposite wall portion 1. As further shown, the wall portions 1-6 are each formed to be solid although a hollowing out of each wall portion could be made to decrease the amount of material needed to make each wall portion so long as the strength of each wall portion is maintained. The bottom 20 of the base portion 12 is provided with a textured gripping surface 22 so as to prevent the calf stretching apparatus 10 from slipping during use. Similarly, the top of the base portion 12 is provided with textured gripping surface 23 to reduce slipping of the user's foot or shoe when placed inside the calf stretching apparatus 10 when stretching. The gripping surface 22 may extend over the entire bottom surface of the base portion 12 or around the perimeter of the bottom surface of the base portion of the calf stretching apparatus 10. The wall portions 1-6 and the base portion 12 may be integrally formed or as shown separate pieces that are attached as by adhesive or chemical bonding, welding, or other forms of fastening known in the art.

Figure 3:
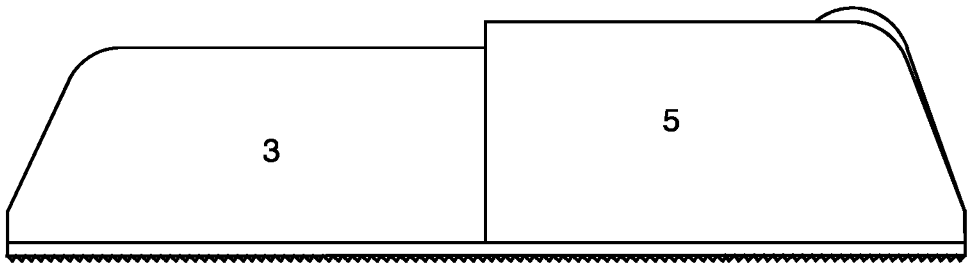
FIG. 3 is a first side view of the calf stretching apparatus shown in FIG. 1.
Figure 4:
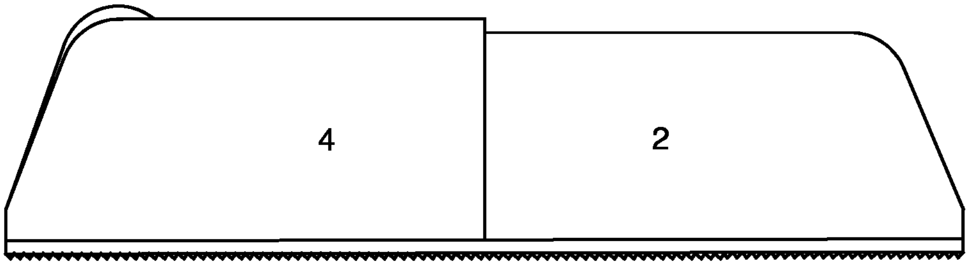
FIG. 4 is a second side view of the calf stretching apparatus shown in FIG. 1.
Figure 5:
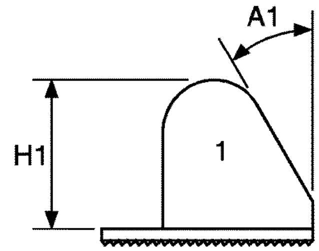
FIGS. 5-10 are cross-sectional side views of each of the calf stretching portions of the calf stretching apparatus of FIG. 1.
Figure 6:
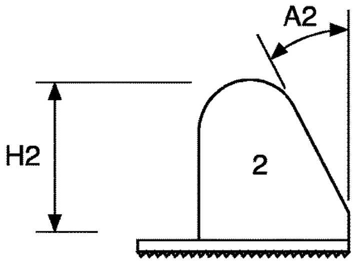
Figure 7:
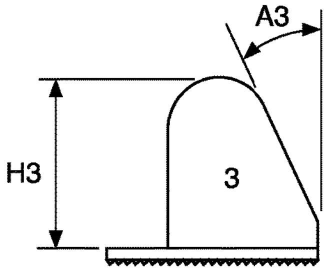
Figure 8:
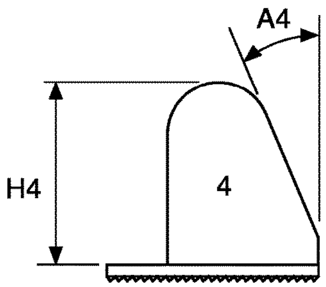
Figure 9:
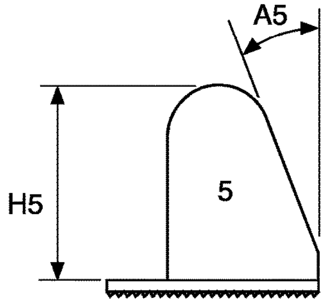
Figure 10:
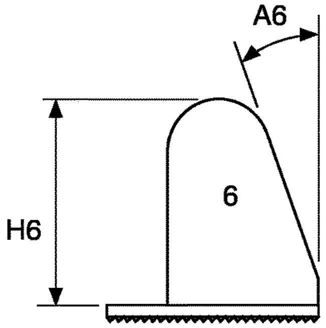

Similarly, as shown in FIGS. 3 and 4, the wall portion 3 transitions to wall portion 5, which transitions to wall portion 6 and the wall portion 2 transitions to wall portion 4, which also transitions to wall portion 6 but on the opposite side of wall portion 6. Gripping surfaces could also be included on the radiused top wall portions to reduce slipping of the user's foot or shoe when conducting stretching exercises with the calf stretching apparatus.

Referring now to FIGS. 5-10, there is illustrated in cross-section each of the wall portions 1-6 of the calf stretching apparatus 10. Each of the heights H1-H6 increase in size from H1 to H2 to H3 to H4 to H5 to H6. Likewise, each of the outside wall angles A1-A5 decrease in angle size from A1 to A2 to A3 to A4 to A5 to A6. Specifically, each wall portion 1-6 may have a height H1-H6 and outside wall angles as follows:

Wall portion 1: H1=2 inches, A1=15.9 degrees
Wall portion 2: H2=2.25 inches, A2=14.0 degrees
Wall portion 3: H3=2.5 inches, A3=12.52 degrees
Wall portion 4: H4=2.75 inches, A4=11.3 degrees
Wall portion 3: H5=3 inches, A5=10.3 degrees
Wall portion 6: H6=3.25 inches, A6=9.46 degrees Of course, it is also contemplated that each wall portion could vary in height +/−0.5 inches with the corresponding outside angles also varying +/−5 degrees according to the respective height of the wall portion and the thicknesses of the wall sections. Thus, each height and each angle is approximate. The angled outside surfaces of the respective wall portions 1-6 provide a relief for placing the foot or shoe of a user along the outside surface when using the calf stretching apparatus 10. The angled outside surfaces terminate at a vertical wall portion that extends upwardly from the base portion approximately 0.5 inches, but could be an inch. The angled outside surfaces of the respective wall portions 1-6 also prevent the device from tipping when a user uses the calf stretching apparatus as shown on the right side of FIG. 11 below. The angled outside surface effectively moves the downward force applied to the top of the wall portion closer to the center of the calf stretching apparatus 10 thereby preventing the opposite side of the calf stretching apparatus 10 from being lifted off of the ground.

Figure 11:
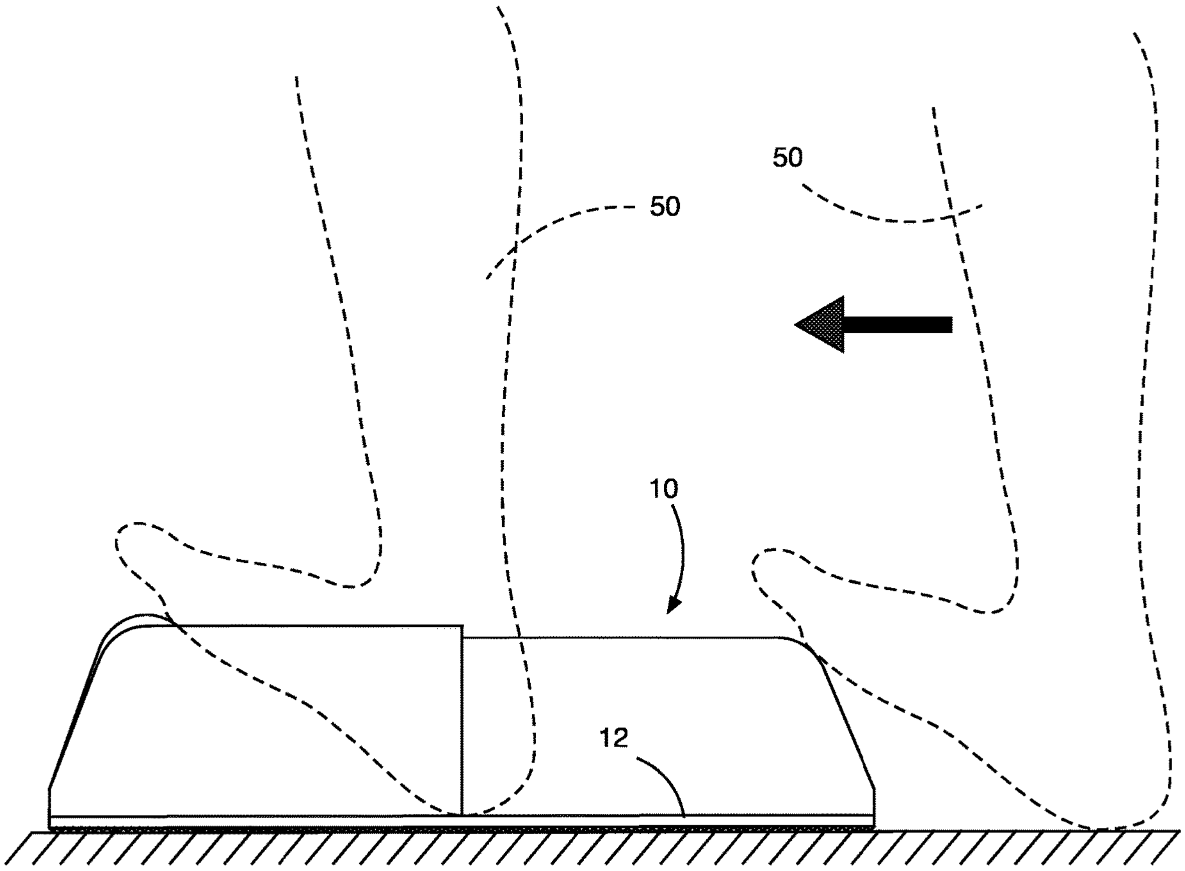
FIG. 11 is a side view of the calf stretching apparatus of FIG. 1 with a foot of a user in first and second calf stretching positions in accordance with the present invention.

As shown in FIG. 11, the calf stretching apparatus 10 is used by a user (represented by the foot and lower leg portion 50 as shown) by placing a distal end of the foot upon the top edge of the calf stretching apparatus 10 on the outside of the calf stretching apparatus 10 and forcing the lower leg portion toward the calf stretching apparatus 10 in order to flex the ankle into an acute angle between the foot and the lower leg portion, which in turn causes a stretching of the calf muscle. As previously mentioned, the angled outside surface of the wall portion prevent the device from tipping when a user places a foot on the outside of the device to perform calf stretching exercises. As further shown in FIG. 11, the calf stretching apparatus 10 can be used by placing the foot inside the interior space defined between the surrounding wall portions with the heal of the foot resting on the bottom plate distal end of the foot extending to the top of one of the selected wall portions of the calf stretching apparatus 10 or (as alternatively shown) on the outside of the calf stretching apparatus 10. Placing the foot inside the interior space also helps to reduce slippage between the calf stretching apparatus 10 and the supporting surface by placing weight of the user on the base portion to hold the base portion to the supporting surface during calf stretching exercises. During use, the user can start at the lowest wall portion and progress in successive stretching steps to the highest wall portion or to the highest wall portion that the user feels adequate calf stretching. A method of calf stretching therefore includes placing the calf stretching apparatus 10 on a support surface and placing a ball of the foot against a top portion of one of the plurality of side walls. Applying pressure to the ball of the foot by leaning forward decreases an angle between the shin and the foot and thereby causes stretching of the calf.

Figure 12:
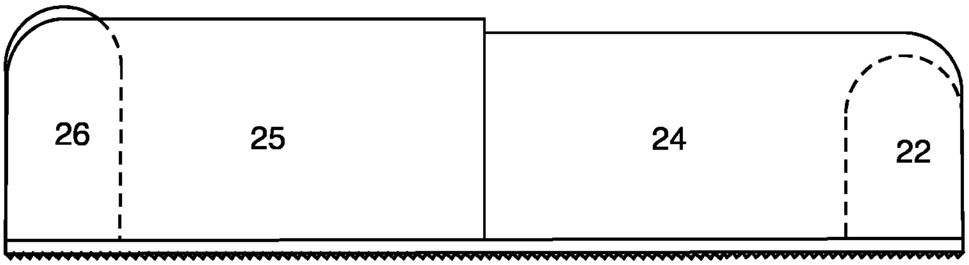
FIG. 12 is a side view of a second embodiment of a calf stretching apparatus according to the present invention.
Figure 13:
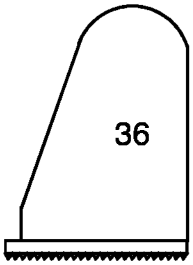
FIG. 13 is a cross-sectional side view of a portion of a third embodiment of a calf stretching apparatus according to the present invention.
Figure 14:
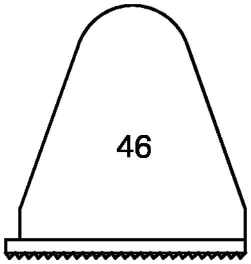
FIG. 14 is a cross-sectional side view of a portion of a fourth embodiment of a calf stretching apparatus according to the present invention.
Figure 15:
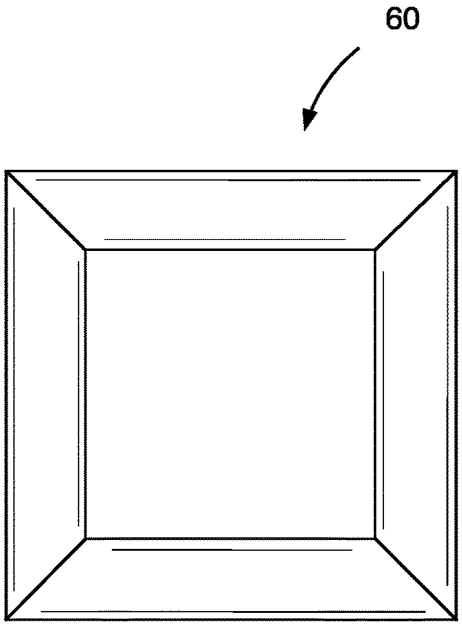
FIG. 15 is a fifth embodiment of a calf stretching apparatus with a square configuration according to the present invention.
Figure 16:
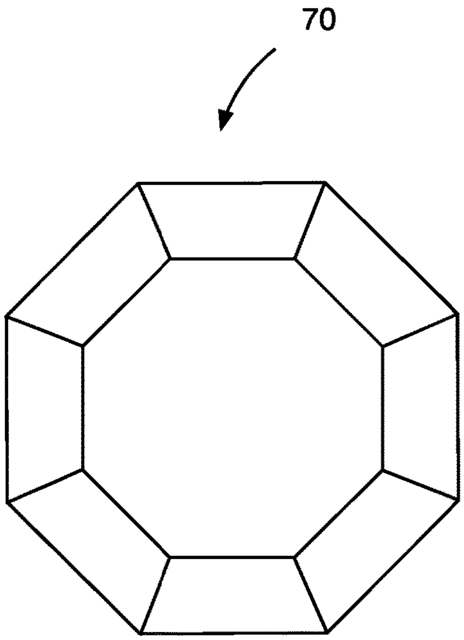
FIG. 16 is a sixth embodiment of a calf stretching apparatus with an octagon configuration according to the present invention.
Figure 17:
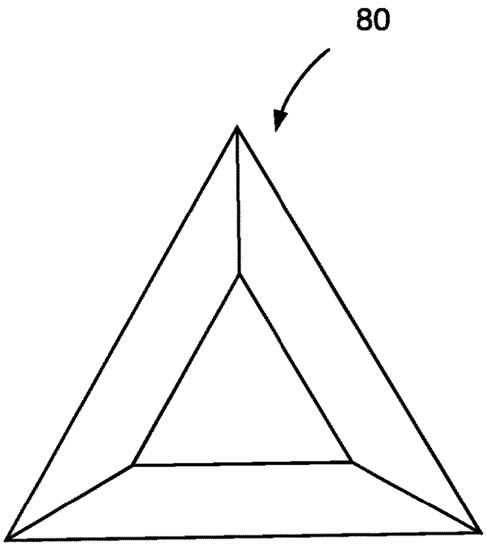
FIG. 17 is a seventh embodiment of a calf stretching apparatus with a triangular configuration according to the present invention.
Figure 18:
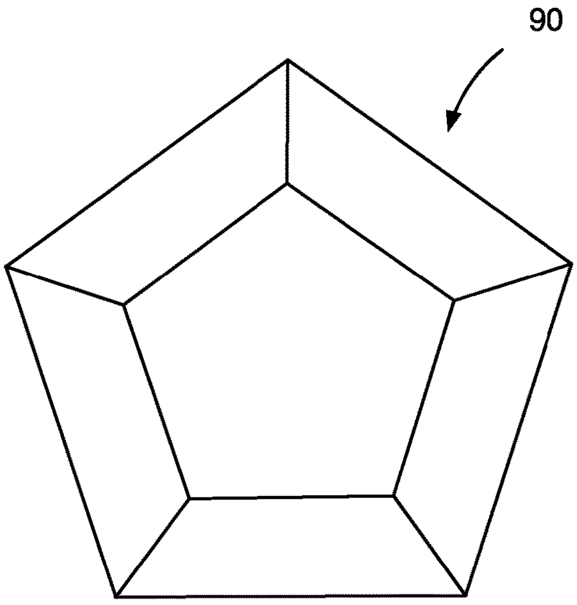
FIG. 18 is an eighth embodiment of a calf stretching apparatus with a pentagon configuration according to the present invention.

As illustrated in FIGS. 12-14, embodiments of calf stretching apparatuses may include wall portions having various cross-sectional shapes. For example, the wall portions (wall portions 22-26 being shown) each have vertical side portions with a rounded top portion. In FIG. 13, the wall portions (wall portion 36 being illustrated) have a vertical outside surface and an inner angled surface (effectively oppositely configured from the wall portions 1-6 shown in FIG. 1). In FIG. 14, the wall portions (wall portion 46 being shown) each have inner and outer angled wall portions to form a triangular-like or trapezoidal-like shape.

As shown in FIGS. 15-18, a calf stretching apparatus according to the invention may be configured with a number of side walls. For example, the calf stretching apparatus 60 shown in FIG. 15 may have a square configuration. Alternatively, the calf stretching apparatus 70 shown in FIG. 16 may have an octagon configuration. Alternatively, the calf stretching apparatus 80 shown in FIG. 17 may have a triangular configuration. Alternatively, the calf stretching apparatus 80 shown in FIG. 18 may have a pentagon configuration. Thus, the calf stretching apparatus of the present invention is not limited to a device having six sides as shown in FIG. 1 but could be configured to have any geometric exterior shape with a plurality of side walls having different heights for different levels of calf stretching.

Figure 19:
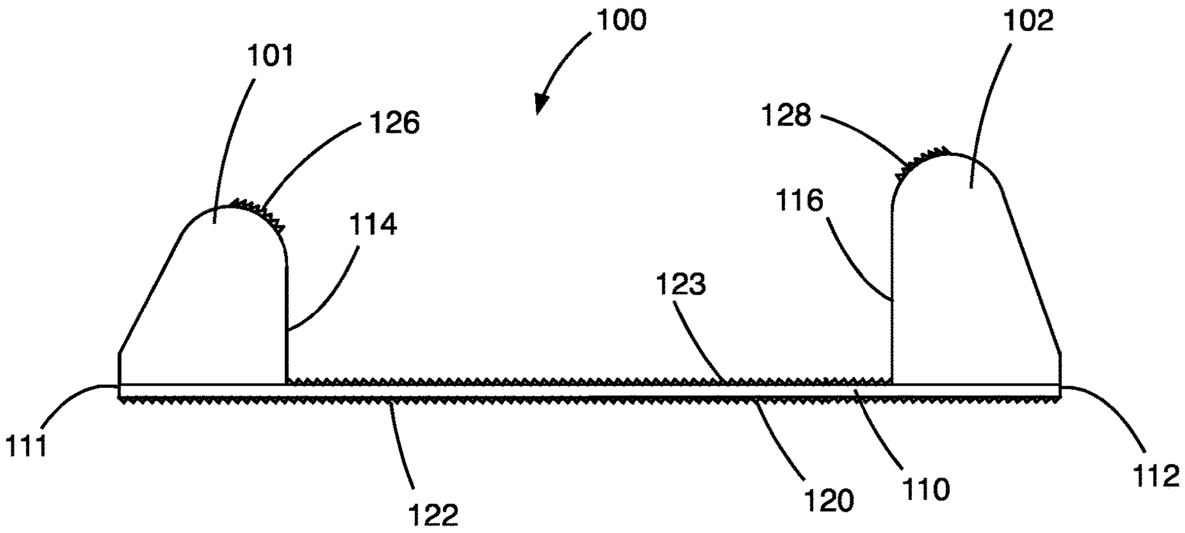
FIG. 19 is a side view of a ninth embodiment of a calf stretching apparatus according to the present invention.

Finally, as shown in FIG. 19, another embodiment of a calf stretching apparatus, generally indicated at 100, in accordance with the principles of the invention is comprised of a planar base plate 110 bound by two wall sections 101 and 102 positioned on opposite sides of the base plate 110. In this embodiment, the base plate 110 and thus the calf stretching apparatus 100 has a rectangular shape when viewed from the top. The wall sections 101 and 102 each are positioned along and thus form one side of the calf stretching apparatus 100. Each wall section 101 and 102 has a width that extends from a respective outer edge 111 and 112 of the calf stretching apparatus 100 to inner wall surfaces 114 and 116, respectively, that provides sufficient lateral support to the wall sections 101 and 102 when the weight of a user is placed on top of a particular wall portion 101 or 102 without bending or collapsing. Each wall section 101 and 102 may have a width of approximately 2 inches. In addition, each wall section 101 and 102 has a different height to provide different levels of calf stretching for a user.

The length of each wall section 101 and 102 is the same so as to form opposite sides of the rectangularly shaped base plate 110, with the length of each wall section 101 and 102 being sufficient to support the foot of user when placed thereon, including a width of a shoe if so worn by the user. Thus, each wall section 101 and 102 may have a length of approximately 5-6 inches but could be more to increase the overall size of the calf stretching apparatus 100.

While not visible in this view, the base plate 110 may define an oblong opening at one side thereof proximate to one of the side wall sections 101 or 102. The width and length of the opening may be sized to receive a hand of user to reach through the opening and grasp the calf stretching apparatus 100 for carrying. The opening also provides an aperture through which the calf stretching apparatus 100 can be secured to a structure with a locking cable, chain or other similar device to prevent the calf stretching apparatus 100 from being removed from the premises.

As further shown in FIG. 19, each wall portion 101 and 102 has a different height. The wall portions 101 and 102 are each formed to be solid although a hollowing out of each wall portion could be made to decrease the amount of material needed to make each wall portion so long as the strength of each wall portion is maintained.

The bottom 120 of the base portion 110 is provided with a textured gripping surface 122 so as to prevent the calf stretching apparatus 100 from slipping during use. Similarly, the top of the base portion 110 is provided with textured gripping surface 123 to reduce slipping of the user's foot or shoe when placed inside the calf stretching apparatus 100 when stretching. The gripping surface 122 may extend over the entire bottom surface of the base portion 110 or around the perimeter of the bottom surface of the base portion of the calf stretching apparatus 100. Likewise, gripping surfaces 126 and 128 may extend over a portion of the top of each wall section 101 and 102, respectively, to provide a traction surface for the foot or shoe of the user when using the calf stretching apparatus 100. The wall portions 101 and 102 and the base portion 110 may be integrally formed or separate pieces that are attached as by adhesive or chemical bonding, welding, or other forms of fastening known in the art.

As previously mentioned, each of the wall sections 101 and 102 are different heights and may be configured similarly to any combination of pairs of wall portions 1-6 shown in FIG. 5-10. For example, wall section 101 may have a height of 2 inches and wall section 102 may have a height of 3.25 inches. Alternatively, wall section 101 may have a height of 2.25 inches and wall section 102 may have a height of 2.75 inches. Thus, each of the wall sections 101 and 102 may have any paired combination of heights selected from the heights of 2 inches, 2.25 inches, 2.5 inches, 2.75 inches, 3 inches and 3.25 inches.

Of course, it is also contemplated that other heights of each wall section 101 and 102 could vary in height from those specific heights referenced above with the corresponding outside angles also varying according to the respective height of the wall portion. The angled outside surfaces of the respective wall portions 101 and 102 provide a relief for placing the foot or shoe of a user along the outside surface when using the calf stretching apparatus 100 and also provide a buttress to support each wall section 101 and 102 when the calf stretching apparatus is used with the foot of the user positioned between the two wall sections 101 and 102.

It should be noted that while the calf stretching apparatus of the present invention has been shown and described as having a particular geometric shape when viewed from the top, other geometric shapes could be employed without departing from the spirit and scope of the present invention. For example, and not by way of limitation, the calf stretching apparatus of the present invention could be configured to be triangular, square, pentagon, octagon, etc., with each side of such shape bound by a wall of a different height. In addition, the calf stretching apparatus of the present invention could be integrally molded or formed from a single piece of material, such as rubber, plastic, metal, wood or other materials known in the art or could be formed from a plurality of pieces that are attached by welding, adhesive bonding or mechanical fastening, each of which are contemplated as part of the present invention.

There is thus disclosed an improved calf stretching apparatus and method of using the improved calf stretching apparatus. In the foregoing specification, the present invention has been described with reference to specific exemplary embodiments. Various modifications and changes may be made, however, without departing from the spirit and scope of the present invention as set forth in the claims, including combinations of elements of the various illustrated embodiments. The specification and figures are illustrative, not restrictive, and modifications are intended to be included within the scope of the present invention. Accordingly, the scope of the present invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The phrase "consisting essentially of" as used herein is intended to cover additional elements or functions that do not materially affect the basic and novel characteristics of the claimed invention. Thus, "consisting essentially of" is intended to encompass not only those components specifically listed, but also separate or additional components that do not materially alter the specifically recited functions or elements.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. A calf stretching apparatus, comprising:

a planar base having a plurality of sides;

a plurality of side walls upwardly depending from the planar base, each of the plurality of side walls extending along a respective side of the planar base and each of the plurality of side walls having a different height than an adjacent side wall, the plurality of side walls defining an inner space between an inside surface of each of the plurality of side walls and a portion of planar base extending between each of the plurality of side walls;

wherein the planar base portion defines an oblong opening that extends therethrough and that is configured to be grasped by a user;

the oblong opening is positioned proximate the inside surface of one of the plurality of side walls and extends parallel thereto.

2. The calf stretching apparatus of claim 1, wherein each of the plurality of side walls has a height in a range from approximately 2 inches to approximately 3.3 inches.

3. The calf stretching apparatus of claim 1, wherein the plurality of side walls comprises six side walls forming a hexagonal shape when viewed from the top.

4. The calf stretching apparatus of claim 3, wherein a first side wall of the plurality of side walls has a height of approximately 2 inches, a second side wall of the plurality of side walls has a height of approximately 2.3 inches, a third side wall of the plurality of side walls has a height of approximately 2.5 inches, a fourth side wall of the plurality of side walls has a height of approximately 2.8 inches, a fifth side wall of the plurality of side walls has a height of approximately 3 inches, and a sixth side wall of the plurality of side walls has a height of approximately 3.3 inches.

5. The calf stretching apparatus of claim 4, wherein a vertical transition from a change in height is formed between each of the plurality of side walls.

6. The calf stretching apparatus of claim 5, wherein the plurality of side walls and the planar base are formed from rubber or plastic.

7. The calf stretching apparatus of claim 1, wherein the plurality of side walls is interconnected to one another to form a continuous wall around the base.

8. The calf stretching apparatus of claim 1, wherein each of the plurality of side walls is formed from a solid material.

9. A calf stretching apparatus, comprising:

a plate having a top surface, a bottom surface and a plurality of perimeter edges;

a plurality of side wall forming a continuous wall around the plate upwardly extending from the top surface of the plate and disposed along the plurality of perimeter edges, each of the plurality of side walls having a different height and each of the plurality of side walls disposed proximate a respective perimeter edge of the plate, the plurality of side walls defining an inner space between an inside surface of each of the plurality of side walls and the top surface of the plate;

wherein the plate defines an oblong opening that extends therethrough and that is configured to be grasped by a user;

the oblong opening is positioned proximate the inside surface of one of the plurality of side walls and extends parallel thereto.

10. The calf stretching apparatus of claim 9, wherein the plurality of perimeter edges define a hexagon shape and the plurality of side walls comprises six side walls, with each of the plurality of side walls extending along a respective perimeter edge of the plate.

11. The calf stretching apparatus of claim 10, wherein each of the plurality of side walls have a height ranging from 2 inches to 3.3 inches.

12. The calf stretching apparatus of claim 11, wherein a first side wall of the plurality of side walls has a height of approximately 2 inches, a second side wall of the plurality of side walls has a height of approximately 2.3 inches, a third side wall of the plurality of side walls has a height of approximately 2.5 inches, a fourth side wall of the plurality of side walls has a height of approximately 2.8 inches, a fifth side wall of the plurality of side walls has a height of approximately 3 inches, and a sixth side wall of the plurality of side walls has a height of approximately 3.3 inches.

13. The calf stretching apparatus of claim 10, wherein the outside surface of each of the plurality of side walls is angled toward the top surface of the plate with a first side wall of the plurality of side walls at an angle of approximately 74 degrees relative to the top surface of the plate, a second side wall of the plurality of side walls at an angle of approximately 76 degrees relative to the top surface of the plate, a third side wall of the plurality of side walls at an angle of approximately 77 degrees relative to the top surface of the plate, a fourth side wall of the plurality of side walls at an angle of approximately 79 degrees relative to the top surface of the plate, a fifth side wall of the plurality of side walls at an angle of approximately 80 degrees relative to the top surface of the plate and a sixth side wall of the plurality of side walls at an angle of approximately 81 degrees relative to the top surface of the plate.

14. The calf stretching apparatus of claim 10, wherein the bottom surface of the plate includes a textured gripping surface.

15. The calf stretching apparatus of claim 9, wherein each of the plurality of side walls has a curved top surface extending between the inside surface of the side wall and an outside surface of the side wall.

16. The calf stretching apparatus of claim 15, wherein the inside surface of each of the plurality of side walls is oriented at a 90 degree angle to the top surface of the plate.

17. The calf stretching apparats of claim 16, wherein the outside surface of each of the plurality of side walls is angled toward the top surface of the plate at an angle less than 90 degrees relative to the top surface of the plate.

18. A method of calf stretching, comprising: placing a calf stretching apparatus on a support surface, the calf stretching apparatus, comprising:

a plate having a top surface, a bottom surface and a plurality of perimeter edges;

a plurality of side wall forming a continuous wall around the plate upwardly extending from the top surface of the plate and disposed along the plurality of perimeter edges, each of the plurality of side walls having a different height and each of the plurality of side walls disposed proximate a respective perimeter edge of the plate, the plurality of side walls defining an inner space between an inside surface of each of the plurality of side walls and the top surface of the plate;

wherein the plate defines an oblong opening that extends therethrough and that is configured to be grasped by a user;

the oblong opening is positioned proximate the inside surface of one of the plurality of side walls and extends parallel thereto; and placing a ball of a foot against one of the plurality of side walls and applying pressure to the ball of the foot by leaning forward to decrease an angle between a respective shin and the foot to stretch the calf.

* * * * *